(12) United States Patent
Shimokawa

(10) Patent No.: US 7,567,494 B2
(45) Date of Patent: Jul. 28, 2009

(54) APPARATUS AND METHOD FOR RECORDING AND REPRODUCING HOLOGRAM

(75) Inventor: Satoshi Shimokawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 498 days.

(21) Appl. No.: 11/545,395

(22) Filed: Oct. 10, 2006

(65) Prior Publication Data
US 2007/0109944 A1 May 17, 2007

(30) Foreign Application Priority Data
Nov. 15, 2005 (JP) ............................. 2005-329746

(51) Int. Cl.
*G11B 7/00* (2006.01)
(52) U.S. Cl. ...................................... 369/103
(58) Field of Classification Search ................. 369/103, 369/109.01, 109.02; 359/8–10, 22
See application file for complete search history.

(56) References Cited

U.S. PATENT DOCUMENTS

| | | | |
|---|---|---|---|
| 6,958,967 B2 | 10/2005 | Kasazumi et al. | |
| 7,227,827 B2 * | 6/2007 | Horimai et al. | 369/103 |
| 7,254,106 B2 * | 8/2007 | Ichihara et al. | 369/103 |
| 7,274,497 B2 * | 9/2007 | Tsukagoshi et al. | 359/22 |
| 7,518,974 B2 * | 4/2009 | Yamakage et al. | 369/103 |
| 2005/0002311 A1 * | 1/2005 | Ichihara et al. | 369/103 |
| 2006/0158988 A1 * | 7/2006 | Uchida | 369/103 |
| 2006/0203689 A1 * | 9/2006 | Kanaoka et al. | 369/103 |
| 2008/0298207 A1 * | 12/2008 | Teraoka et al. | 369/103 |

FOREIGN PATENT DOCUMENTS

JP 2002-216359 8/2002

* cited by examiner

*Primary Examiner*—Thang V Tran
(74) *Attorney, Agent, or Firm*—Greer, Burns & Crain, Ltd.

(57) ABSTRACT

The apparatus includes an address information writer that writes address information representing the position of the unit sectors in the recording medium when recording the hologram in each of the unit sectors, an address information reader that reads out the address information from the recording medium when reproducing the hologram from the plurality of unit sectors where the hologram is recorded, and an illumination position controller that sequentially positions the illumination spot only containing the reference beam on the plurality of unit sectors based on the address information read out, and relatively displaces the illumination spot from one of the unit sectors to another through a shortest path.

6 Claims, 8 Drawing Sheets

APPARATUS AND METHOD FOR RECORDING AND REPRODUCING HOLOGRAM

BACKGROUND OF THE INVENTION

1. Field of the Invention

The present invention relates to a hologram recording and reproducing apparatus that records and reproduces a hologram, and to a method of recording and reproducing the hologram.

2. Description of the Related Art

Hologram recording and reproducing apparatuses so far developed include one disclosed in JP-A-2002-216359. The hologram recording and reproducing apparatus disclosed therein basically works as follows. The hologram recording and reproducing apparatus splits a laser beam emitted by a laser light source into an information beam and a reference beam, and modulates the information beam with a spatial light modulator to illuminate a discal recording medium (disk), while transmitting the reference beam to the disk to form an illumination spot thereon, such that the illumination spot is superposed on the information beam on the disk. As a result, the information beam and the reference beam interfere with each other on a unit sector on the disk corresponding to the illumination spot, thus creating a hologram is recorded on the disk in a form of an interference fringe pattern. When the disk was rotated at a certain angular increment, the illumination spot was relatively moved. Forming an illumination spot each time the disk is stopped leads to formation of a multitude of unit sectors circumferentially aligned on the disk at a constant pitch to constitute a track.

For reading out the hologram in a reconstruction process, the illumination spot only containing the reference beam is positioned on the track including a desired unit sector, and the disk is rotated in one direction by the increment corresponding to the pitch of the unit sectors, as in a seek action of a popular photomagnetic disk apparatus. Thus, the illumination spot only containing the reference beam is positioned on each unit sector to receive a reconstruction beam emitted by each unit sector, whereby the desired hologram is reconstructed. For sequentially reproducing the hologram from a plurality of unit sectors, the foregoing action is repeatedly performed.

In the conventional hologram recording and reproducing apparatus as described above, however, the disk is stopped so as to illuminate a unit sector in the reconstruction process at every time determination is required whether the hologram contains the desired information. In this operation, the recording medium is always rotated in one predetermined direction. As a result, a standby time corresponding to one entire rotation at maximum can be spent in addition to the seek time in the process to move the illumination spot relatively from the current unit sector to the unit sector from which the hologram is to be reconstructed. Accordingly, the conventional hologram recording and reproducing apparatus requires a considerably longer access time than other popular photomagnetic disk apparatuses, and hence has a room for improvement in the aspect of the access time.

SUMMARY OF THE INVENTION

The present invention has been proposed under the foregoing situation. An object of the present invention is to provide a hologram recording and reproducing apparatus and a method of recording and reproducing the hologram, that significantly shorten the access time.

To achieve the foregoing object, the present invention takes the following technical measures.

A first aspect of the present invention provides a hologram recording and reproducing apparatus recording a hologram in a plurality of unit sectors each corresponding to an illumination spot formed by superposing an information beam and a reference beam on a recording medium which is discal or spherical, and also reproducing the hologram based on light from each of the unit sectors when the illumination spot containing only the reference beam is relatively moved and then stopped at the position where the hologram is recorded. The apparatus comprises an address information writer that writes address information representing the position of the unit sector in the recording medium when it is performed to record the hologram in each of the unit sectors; an address information reader that reads out the address information from the recording medium when it is performed to reproduce the hologram from the plurality of unit sectors where the hologram is recorded; and an illumination position controller that sequentially positions the illumination spot only containing the reference beam on the plurality of unit sectors based on the address information read out, and relatively moves the illumination spot from one of the unit sectors to another through a shortest path.

Preferably, the recording medium is discal, and the hologram recording and reproducing apparatus further comprises a rotational driver that rotates the recording medium in both directions, and an illumination spot moving device that reciprocates the illumination spot radially of the recording medium, wherein the rotational driver rotates the recording medium in either direction by not more than 180 degrees while the illumination position controller moves the illumination spot radially by a predetermined amount at the same time in order to relatively move the illumination spot from a unit sector to another unit sector circumferentially and radially spaced.

Or else, preferably, the recording medium is spherical, and the hologram recording and reproducing apparatus further comprises a rotational driver that rotates the recording medium in both directions around a predetermined axis, and an illumination spot moving device that reciprocates the illumination spot along the predetermined axis, wherein the rotational driver rotates the recording medium in either direction by not more than 180 degrees while the illumination position controller moves the illumination spot radially by a predetermined amount at the same time in order to relatively move the illustration spot from a unit sector to another unit sector spaced circumferentially and along the predetermined axis.

Preferably, the rotational driver may be an ultrasonic motor.

A second aspect of the present invention provides a method of recording and reproducing a hologram. The method includes recording a hologram in a plurality of unit sectors each corresponding to an illumination spot formed by superposing an information beam and a reference beam on a recording medium which is discal or spherical, and also includes reproducing the hologram based on light from each of the unit sectors when the illumination spot containing only the reference beam is relatively moved and then stopped at the position where the hologram is recorded. The method comprises an address information writing step including writing address information representing the position of the unit sector in the recording medium when it is performed to record the hologram in each of the unit sectors; an address information reading step including reading out the address information from the recording medium when it is performed to reproduce the hologram from the plurality of unit sectors where the hologram is recorded; and an illumination spot position controlling step including sequentially positioning the illumination spot only containing the reference beam on the plurality of unit sectors based on the address information read out, and relatively displacing the illumination spot from one of the unit sectors to another through a shortest path.

Under such configuration, the illumination spot is relatively displaced through the shortest path from the current unit sector to a next unit sector, when it is performed to reproduce the hologram from a plurality of unit sectors. Therefore, referring for example to the discal recording medium rotatable in both directions, it suffices to rotate the recording medium in either direction by not more than 180 degrees simultaneously with the seek action, which significantly shortens the access time.

Other features and advantages of the present invention will become more apparent through detailed description given below referring to the accompanying drawings.

DETAILED DESCRIPTION OF THE PREFERRED EMBODIMENT

Preferred embodiments of the present invention will be described below with reference to the accompanying drawings. FIGS. 1 through 7 illustrate an embodiment of a hologram recording and reproducing apparatus according to the present invention.

Figure 1:
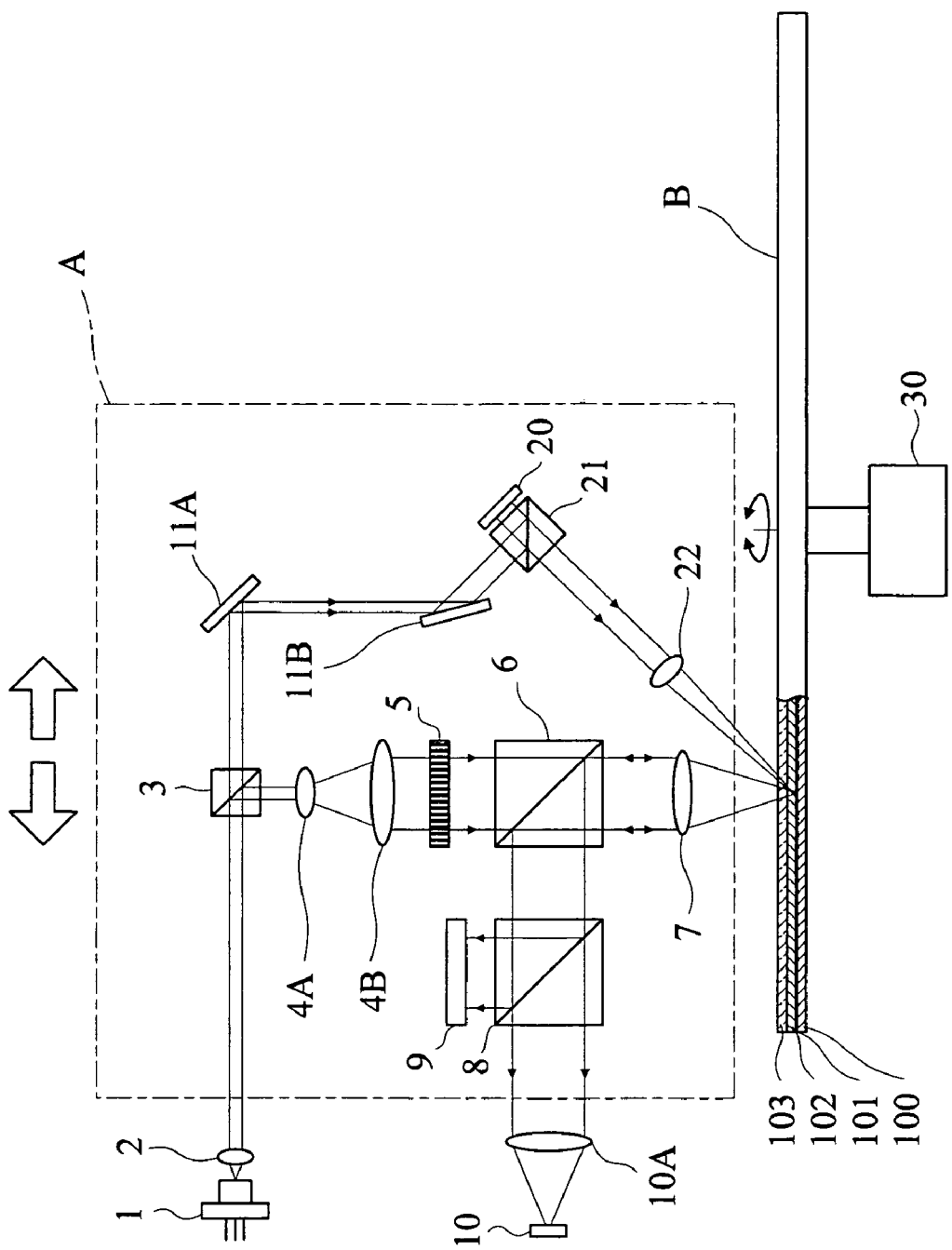
FIG. 1 is a schematic diagram showing a hologram recording and reproducing apparatus according to an embodiment of the present invention.
Figure 2:
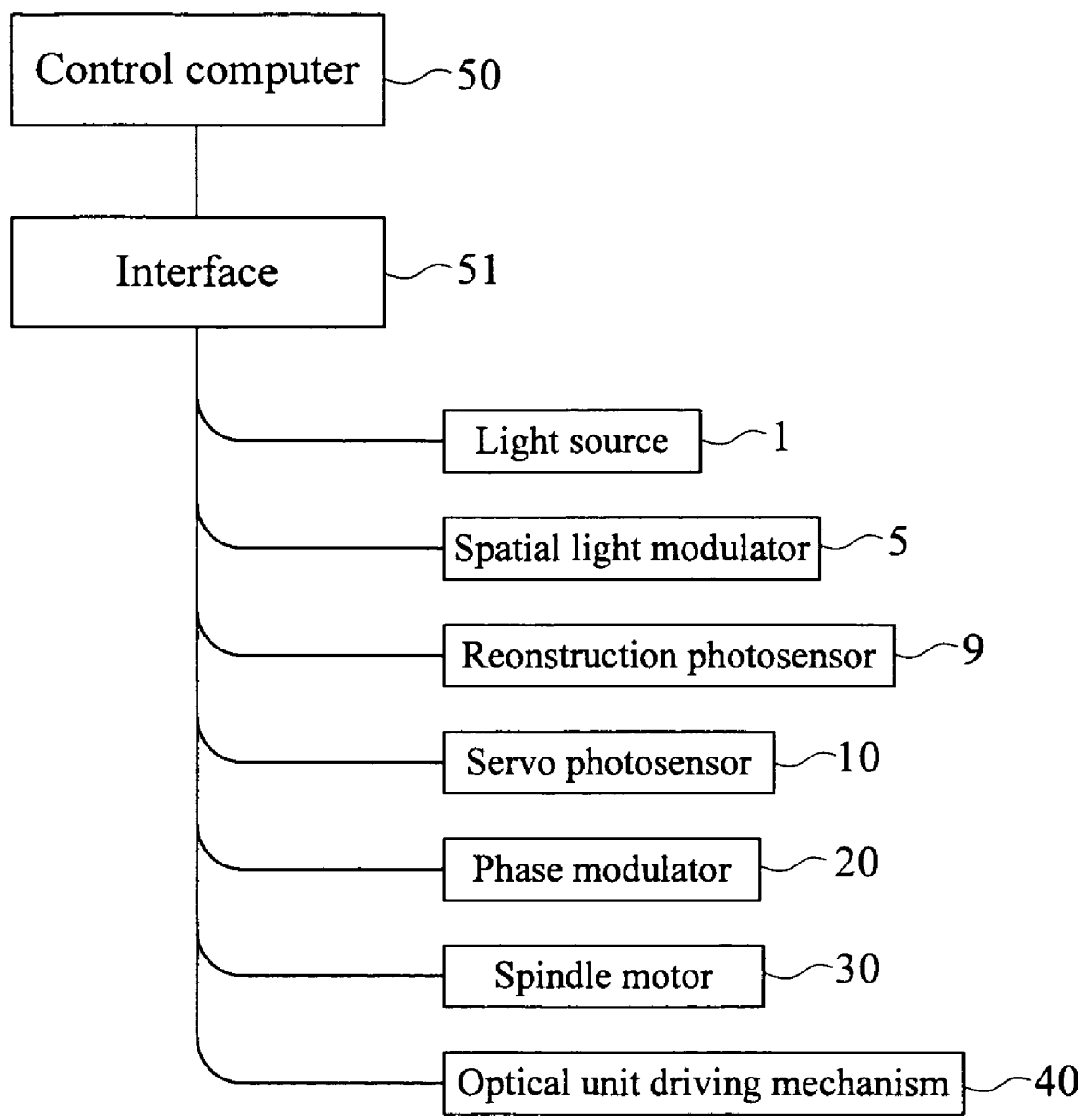
FIG. 2 is a block diagram showing an electrical configuration of the hologram recording and reproducing apparatus of FIG. 1.

Referring to FIG. 1, the hologram recording and reproducing apparatus is designed for recording multiple holograms on a recording medium B based on a phase code multiplex system, and reproducing the recorded holograms. The hologram recording and reproducing apparatus includes a light source 1, a collimator lens 2, a first beam splitter 3, beam expanders 4A, 4B, a spatial light modulator 5, a second beam splitter 6, a first objective lens 7, a third beam splitter 8, a reconstruction photosensor 9, a servo condenser lens 10A, a servo photosensor 10, reflecting plates 11A, 11B, a phase modulator 20, a fourth beam splitter 21, a second objective lens 22, and a spindle motor 30. Some of the important optical elements such as the first objective lens 7 and the second objective lens 22 are incorporated in an optical unit A. From the viewpoint of electrical configuration, the hologram recording and reproducing apparatus includes a control computer 50 that controls the overall operation as shown in FIG. 2. The control computer 50 is connected via an interface 51 to the light source 1, the spatial light modulator 5, the reconstruction photosensor 9, the servo photosensor 10, the phase modulator 20, the spindle motor 30, and an optical unit driving mechanism 40.

Figure 3:
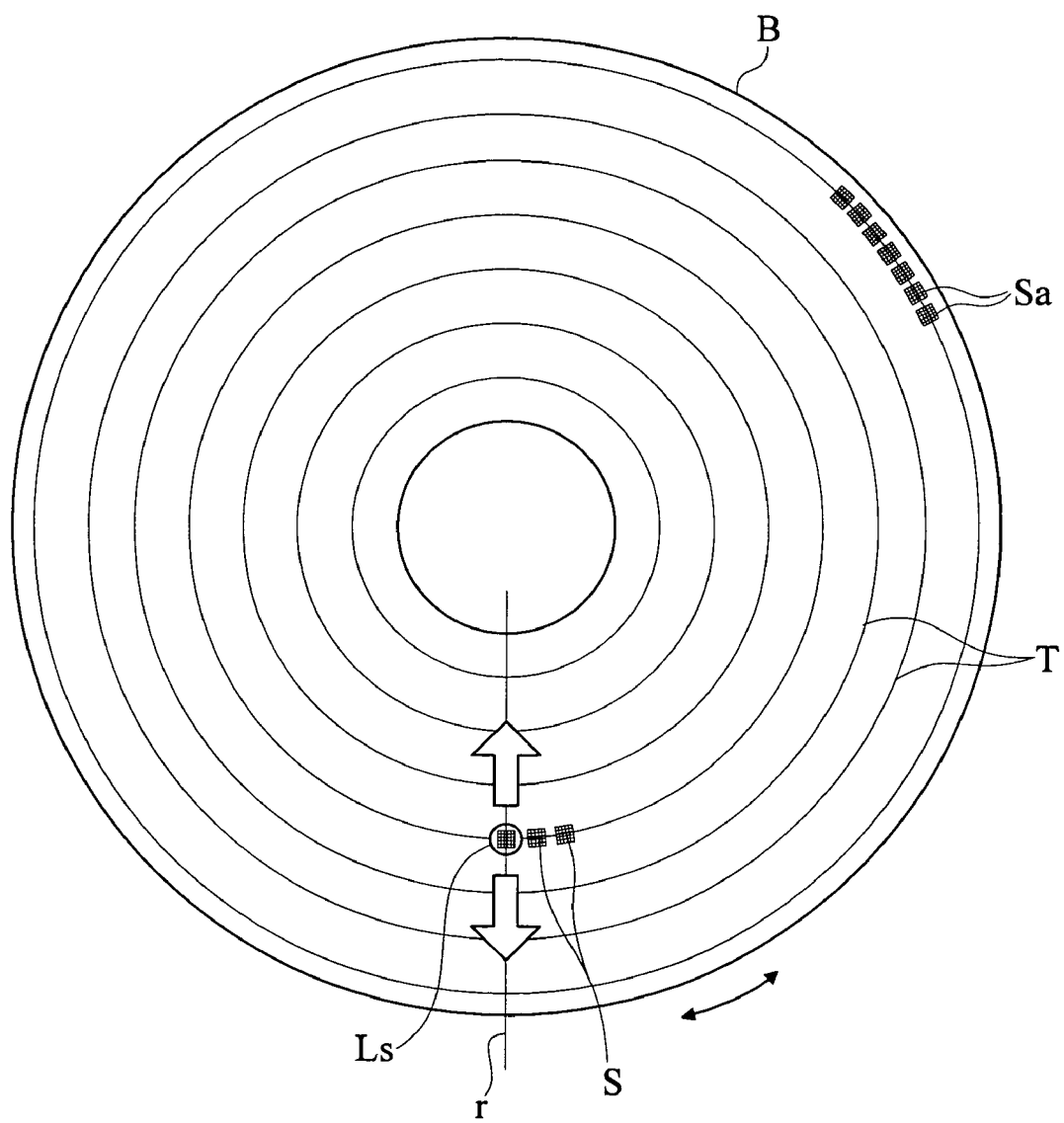
FIG. 3 is a schematic diagram for explaining a general operation of the hologram recording and reproducing apparatus of FIG. 1.

The recording medium B has a multilayer structure including a supporting substrate layer 100, a reflection layer 101, a hologram recording layer 102, and a transparent substrate layer 103 stacked in this sequence, and is formed disk-shaped. An information beam and a reference beam illuminates the hologram recording layer 102 to be superposed so that a hologram constituted of interference fringe (page pattern) is recorded therein. As shown in FIG. 3, a region where the hologram is recorded (corresponding to an illumination spot Ls) constitutes a unit sector S, and a multitude of unit sectors S form concentric tracks T. The unit sectors S adjacently aligned along the track T may be spaced from each other as shown in FIG. 3, or may partially overlap each other. The reflection layer 101 includes an embossed pit (not shown), so that the servo photosensor 10 detects a change of light reflected by the embossed pit for executing servo control such as track control, focus control and tilt control.

The light source 1 may be constituted of a semiconductor laser device, which emits a highly coherent laser beam with a relatively narrow frequency band. The collimator lens 2 converts the laser beam emitted by the light source 1 into a parallel light. The parallel light output by the collimator lens 2 is split by the first beam splitter 3 into an information beam and a reference beam. The information beam is enlarged in diameter by the beam expanders 4A, 4B, and enters the spatial light modulator 5. The reference beam reaches the reflecting plates 11A, 11B and the fourth beam splitter 21, and then enters the phase modulator 20.

The spatial light modulator 5, which serves to convert information to be recorded into a light representing a two-dimensional pixel pattern, may be constituted of a transmissive liquid crystal device. The information beam output by the spatial light modulator 5 is transmitted through the second beam splitter 6 and converged by the first objective lens 7, and then illuminates the recording medium B. On the recording medium B, as shown in FIG. 3, the illumination spot Ls is created by illumination of information beam, and the unit sector S is formed at the position corresponding to the illumination spot Ls. In a recording process, the light reflected by the embossed pit of the reflection layer 101 is transmitted through the first objective lens 7, the second beam splitter 6, the third beam splitter 8 and the condenser lens 10A, to be received by the servo photosensor 10. Through such passage, the illumination spot Ls of the information beam is appropriately adjusted on the recording medium B. When the information beam is emitted in the recording process, the recording medium B is temporarily stopped.

The phase modulator 20, which serves to convert the reference beam into a light of a predetermined phase pattern, may be constituted of a deformable mirror device. In the recording process, the reference beam output by the phase modulator 20 is transmitted through the fourth beam splitter 21 again and converged by the second objective lens 22, to illuminate the recording medium B so as to be superposed on the illumination spot Ls of the information beam. The illumination spot Ls created by the reference beam is formed in each of the unit sectors S, so as to be superposed on the information beam. Employing such phase modulator 20 enables recording multiple holograms of different page patterns in a same unit sector, by changing the phase pattern of the reference beam. This is how the phase code multiplex system works. In a reproducing process, the illumination spot Ls created only by the reference beam is positioned on the unit sector S, so as to generate a reconstruction beam through the interference by the reference beam with the hologram. The reconstruction beam is transmitted through the first objective lens 7, the second beam splitter 6 and the third beam splitter 8, to be received by the reconstruction photosensor 9. As a result, the information recorded in a form of the hologram is optically read out. When the reference beam is emitted in the reproducing process also, the recording medium B is temporarily stopped.

The spindle motor 30 may be an ultrasonic motor that rotates in both directions, and has characteristics such as high precision in position control and holding capability of maintaining coercivity despite disconnecting the power. Such spindle motor 30, when employed as the rotational driver, can repeatedly rotate and stop the recording medium B, in either clockwise or counterclockwise direction as shown in FIG. 3.

The optical unit A can be moved by the optical unit driving mechanism 40 radially of the recording medium B. Accordingly, the illumination spot Ls can be reciprocably moved along the radius r of the recording medium B, in the recording and reproducing process, as shown in FIG. 3. The optical unit driving mechanism 40 thus acts as the illumination spot moving device.

The control computer 50 controls the light source 1, the spatial light modulator 5, the reconstruction photosensor 9, the servo photosensor 10, the phase modulator 20, the spindle motor 30, and the optical unit driving mechanism 40 in the recording and reproducing process. In the recording process, for example, the control computer 50 executes the control so as to record on the unit sector S the hologram according to the information to be recorded, and on an address unit sector Sa (Ref. FIG. 3) the address information representing the position of the unit sector S on the recording medium B. The address information may include the number of tracks or the angle between a predetermined initial point on the track T and the unit sector S. In the reproducing process, the control computer 50 executes the control so as to read out from the address unit sector Sa the address information of the desired unit sector S from which the hologram is to be reconstructed, and to position the illumination spot Ls on the desired unit sector S. Such action reproduces the hologram from the desired unit sector S. Thus, the control computer 50 performs the functions of the address information writer, the address information reader and the illumination position controller.

Next, explanation will be given about the operation performed in the recording and reproducing process.

Figure 4:
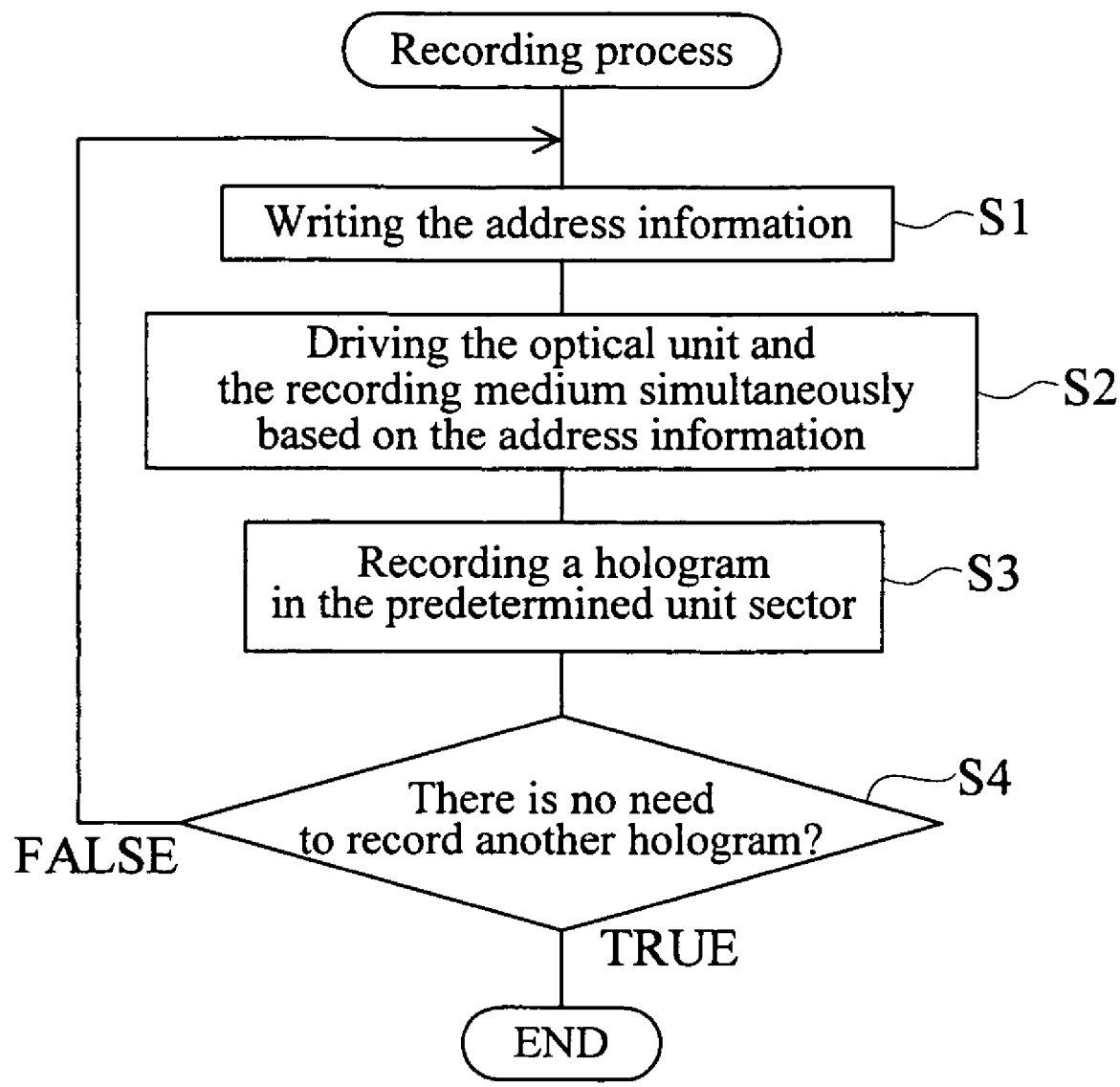
FIG. 4 is a flowchart for explaining a recording process of the hologram recording and reproducing apparatus of FIG. 1.

Referring to FIG. 4, prior to recording the hologram in a predetermined unit sector S in a hologram recording process, the control computer 50 writes the address information of the unit sector S in the address unit sector Sa (S1)

After that, the control computer 50 moves the optical unit A to a predetermined position according to the address information, and at the same time rotates the recording medium B by a predetermined amount (S2). At this stage, the predetermined unit sector S where the hologram is to be recorded stops at the position where the illumination spot Ls is to be created.

Then the control computer 50 adjusts the information beam and the reference beam to superpose on each other and thereby actually create the illumination spot Ls in the unit sector S, thus recording the hologram (S3).

In the case that there is no need to record another hologram (S4: TRUE), the control computer 50 terminates the recording process.

In the case that another hologram is to be recorded in another unit sector S at S4 (S4: FALSE), the control computer 50 resumes the series of operation from S1. In this case, usually the next unit sector S is formed adjacent to the immediately preceding unit sector S on the same track T. When there is no more room to form an additional unit sector S on the same track T, the illumination spot Ls is moved to another vacant track T. When recording the hologram in a plurality of unit sectors, the address information of those sectors may be written in advance at a time, so as to sequentially record the hologram in each unit sector.

Figure 5:
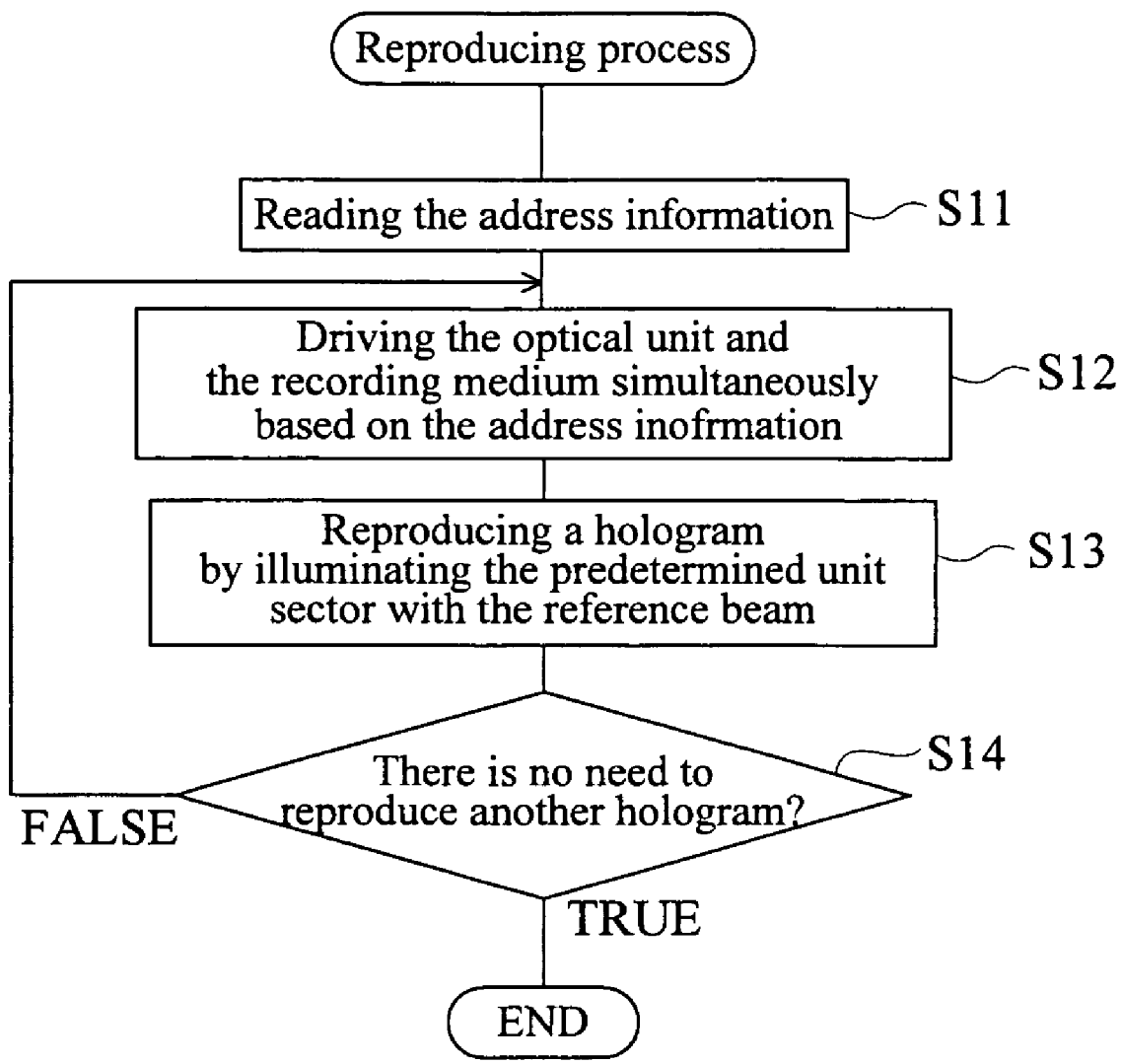
FIG. 5 is a flowchart for explaining a reproducing process of the hologram recording and reproducing apparatus of FIG. 1.
Figure 6:
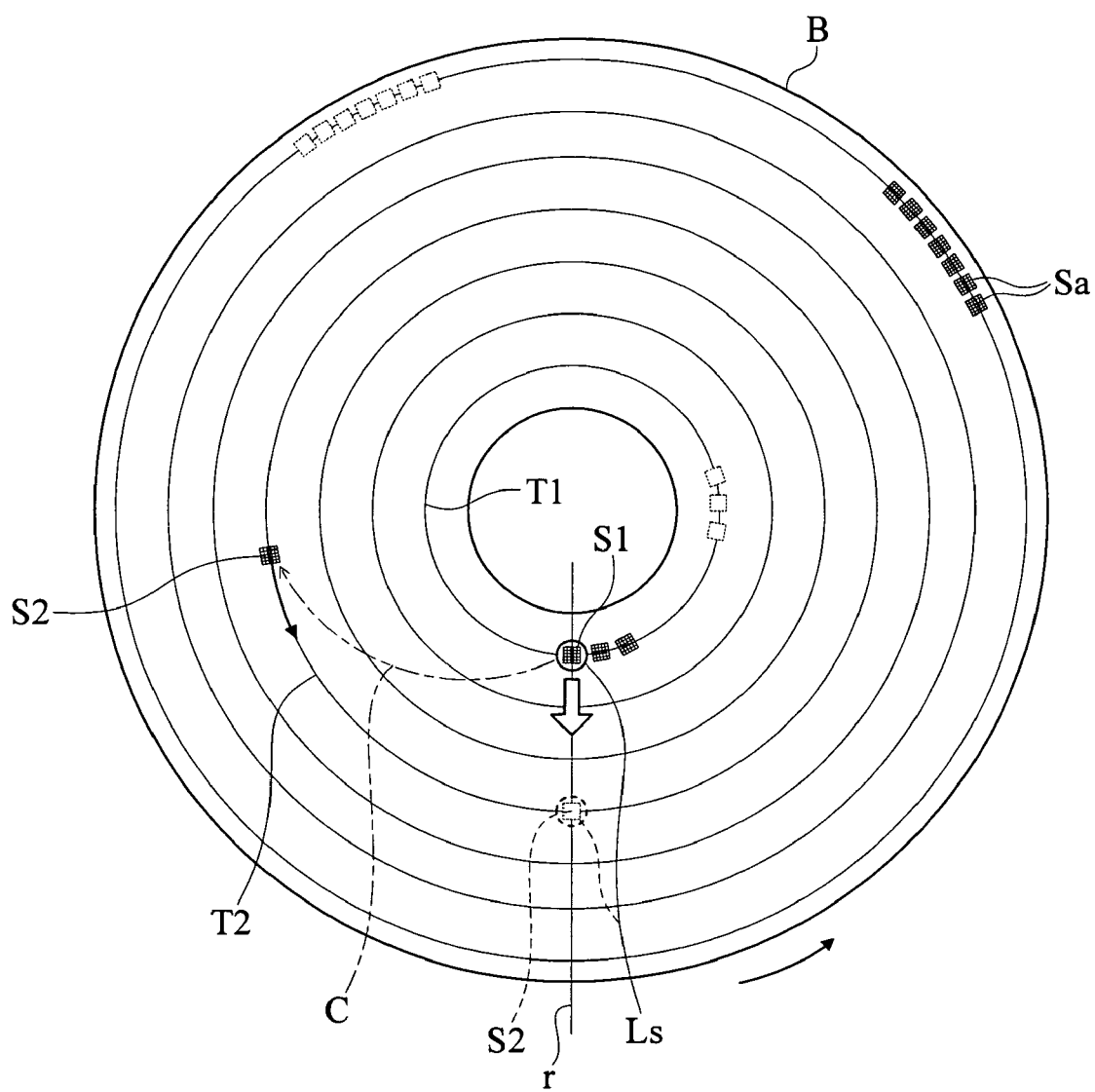
FIG. 6 is a schematic diagram for explaining a reproducing operation of the hologram recording and reproducing apparatus of FIG. 1.

Referring then to FIG. 5, when reproducing the hologram thus recorded in the unit sector the control computer 50 reads out the address information of a desired unit sector S1 (Ref. FIG. 6) from the address unit sector Sa (S11). When a plurality of unit sectors is involved, the address information of those sectors is read out at a time.

After that, the control computer 50 performs a seek action of moving the optical unit A to a predetermined position according to the address information that has been read out, and at the same time rotates the recording medium B by a predetermined amount (S12). At this, stage, the predetermined unit sector S1 from which the hologram is to be reconstructed stops at the position where the illumination spot Ls is to be created.

Then the control computer 50 drives only the reference beam to actually create the illumination spot Ls on the desired unit sector S1, and thus to reproduce the hologram from the unit sector S1 (S13).

In the case that there is no need to reproduce another hologram (S14: TRUE), the control computer 50 terminates the reproducing process.

In the case that another hologram is to be reproduced from another unit sector S1 at S14 (S14: FALSE), the control computer 50 resumes the series of operation from S12.

It is now assumed that, as shown in FIG. 6, the current unit sector S1 on which the illumination spot Ls is positioned is on the track T1, while the unit sector S2 from which the hologram is to be reproduced next is on another track T2 and at a position closer in the clockwise direction from the current unit sector S1. In this case, the control computer 50 performs a seek action of moving the optical unit A to a predetermined position thus to bring the illumination spot Ls on the track T2, and simultaneously rotates the recording medium B counterclockwise by a predetermined amount. Such action causes the illumination spot Ls to relatively move from the current unit sector S1 to the next unit sector S2 through the shortest path C.

Figure 7:
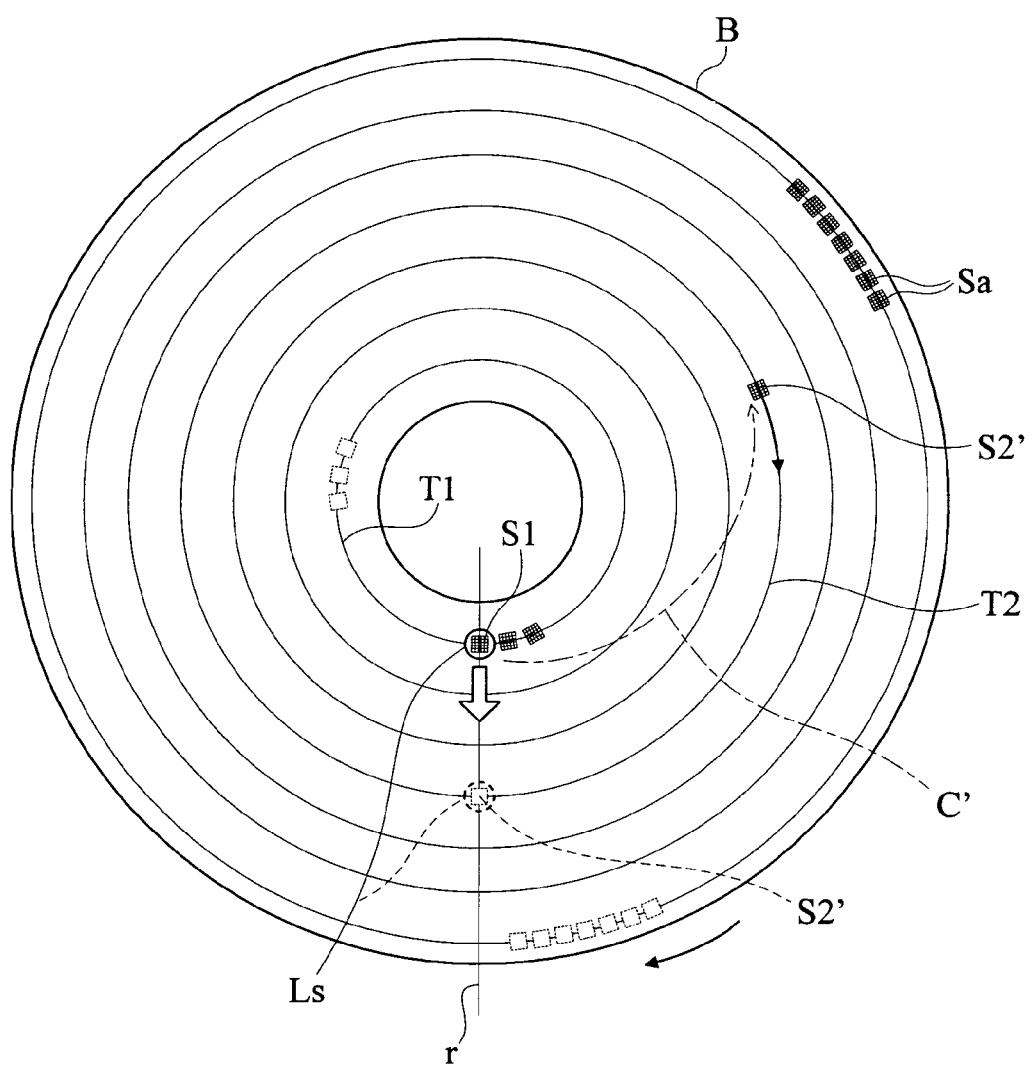
FIG. 7 is a schematic diagram for explaining another reproducing operation of the hologram recording and reproducing apparatus of FIG. 1.

Another example is shown in FIG. 7, in which the unit sector S2' from which the hologram is to be reproduced next is on the track T2, and at a position closer in the counterclockwise direction from the current unit sector S1. In this case, the control computer 50 rotates the recording medium B opposite to the above, i.e. clockwise by a predetermined amount, at the same time as performing the seek action of bringing the illumination spot Ls on the track T2. Such action causes the illumination spot Ls to relatively move from the current unit sector S1 to the next unit sector S2' through the shortest path C'.

Thus, the control computer 50 switches the rotation direction of the recording medium B according to the position of the unit sector from which the hologram is to be reconstructed next, and hence the rotation angle of the recording medium B does not exceed 180 degrees. Accordingly, when reproducing the hologram from a plurality of unit sectors, although the recording medium B is repeatedly rotated and stopped, the illumination spot Ls is quickly positioned on each unit sector sequentially, and the standby time during which the recording medium is rotated is generally shortened when compared with an apparatus that rotates the recording medium only in one direction. Besides, since the seek action and the rotation of the recording medium B are simultaneously performed, the access time is significantly shortened.

Consequently, the hologram recording and reproducing apparatus according to this embodiment switches the rotation direction of the recording medium B according to the position of the unit sector to be accessed in the reproducing process, so that it suffices to rotate the recording medium B by 180 degrees at maximum, and besides the rotation of the recording medium B and the seek action are simultaneously performed. Such arrangement significantly reduces an average access time required in the reproducing process.

Figure 8:
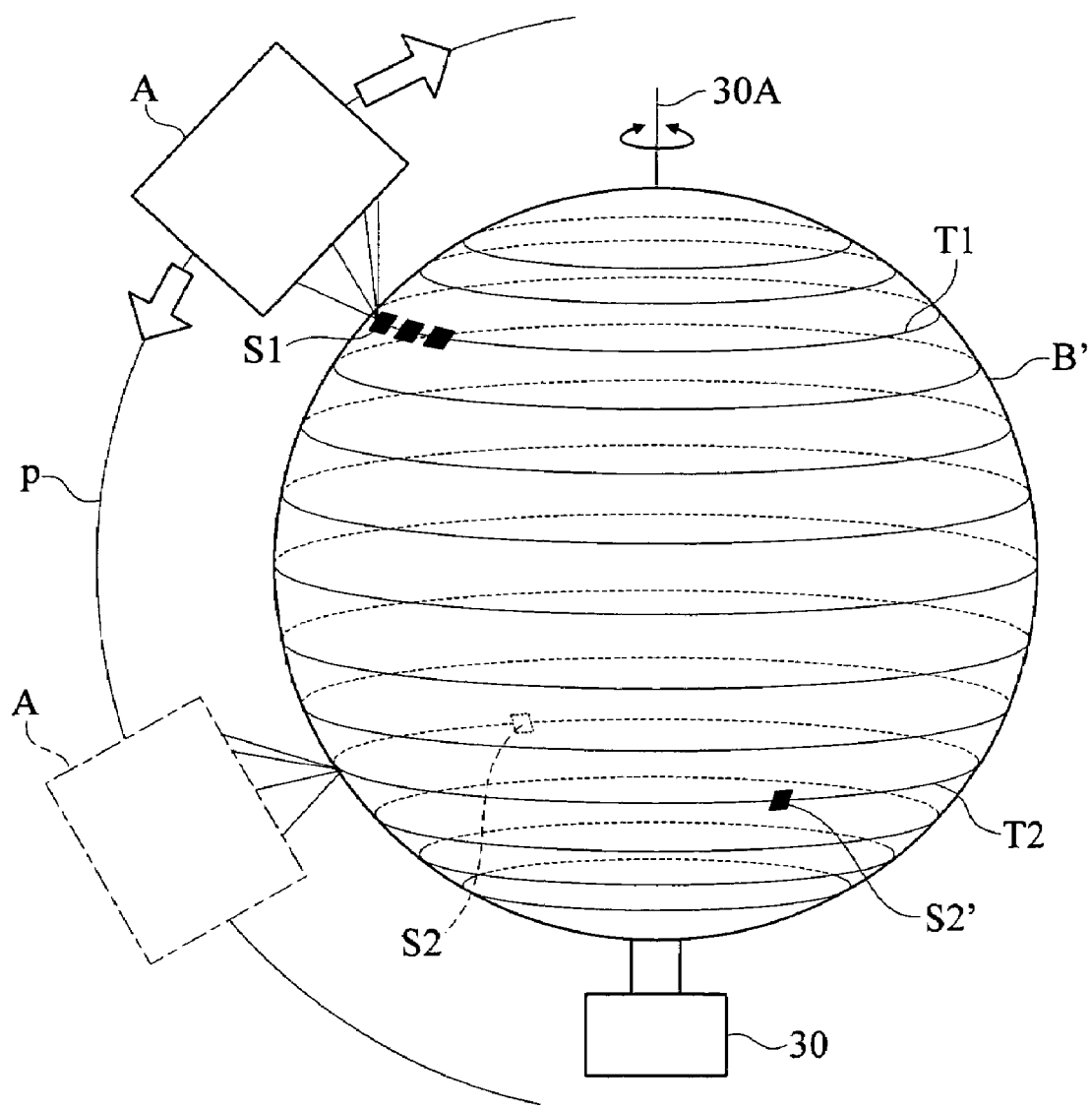
FIG. 8 is a schematic diagram showing a hologram recording and reproducing apparatus according to another embodiment of the present invention.

FIG. 8 is a schematic diagram showing a hologram recording and reproducing apparatus according to another embodiment of the present invention. The same or similar constituents to those in the foregoing embodiment are given the identical numeral, and description thereof will be omitted.

The hologram recording and reproducing apparatus shown in FIG. 8 is designed to access a spherical recording medium B'. More specifically, the recording medium B' is supported by a rotation axis 30A of the spindle motor 30, so as to be rotated in both directions around the rotation axis 30A. The tracks T1, T2 are aligned along the surface of the recording medium B', so as to form concentric circles around the rotation axis 30A. The optical unit A is designed to reciprocably move on an orbit along the rotation axis 30A, with a predetermined constant gap from the surface of the recording medium B'.

When recording the hologram to and reproducing the hologram from such spherical recording medium B' also, the access to the respective unit sectors S1, S2, S2' is similarly performed to the foregoing embodiment.

Specifically, such case is assumed that the unit sector S1 on which the illumination spot Ls is currently positioned is on the track T1, while the unit sector S2 from which the hologram is to be reconstructed next is on another track T2 and at a position closer in the clockwise direction from the current unit sector S1, when viewed from above the recording medium B'. In this case, the seek action is performed to move the optical unit A to a predetermined position on the orbit p (Ref. dash-dot line in FIG. 8), so that the illumination spot is positioned on the track T2, and simultaneously the recording medium B' is rotated counterclockwise by a predetermined amount. Such action causes the illumination spot to relatively move from the current unit sector S1 to the next unit sector S2 through the shortest path C along the surface of the recording medium B'.

Another case is that the unit sector S2' from which the hologram is to be reconstructed next is on the track T2, and at a position closer in the counterclockwise direction from the current unit sector S1. In this case, the recording medium B is rotated opposite to the above, i.e. clockwise by a predetermined amount, at the same time as the seek action of bringing the illumination spot on the track T2. Such action causes the illumination spot to relatively move from the current unit sector S1 to the next unit sector S2' through the shortest path C' along the surface of the recording medium B'.

Thus, with respect to the spherical recording medium B' also, the rotation direction of the recording medium B' is switched according to the position of the unit sector from which the hologram is to be reconstructed next, and hence the rotation angle of the recording medium B' does not exceed 180 degrees. Accordingly, when reproducing the hologram from a plurality of unit sectors, although the recording medium B' is repeatedly rotated and stopped, the illumination spot can be quickly positioned on each unit sector sequentially, and the standby time during which the recording medium is rotated can be generally shortened when compared with an apparatus that rotates the spherical recording medium only in one direction. Besides, since the seek action and the rotation of the recording medium B' are simultaneously performed, the access time can be significantly shortened.

Consequently, the hologram recording and reproducing apparatus including a spherical recording medium B' according to this embodiment equally switches the rotation direction of the recording medium B' according to the position of the unit sector to be accessed in the reproducing process, so that it suffices to rotate the recording medium B' by 180 degrees at maximum, and besides the rotation of the recording medium B and the seek action are simultaneously performed. Such arrangement significantly reduces an average access time required in the reproducing process.

It is to be understood that the present invention is not limited to the foregoing embodiments. For example when the disk-shaped recording medium is employed, although according to the foregoing embodiments the optical unit is caused to reciprocably moved, the fixed optical unit may be fixed so as to reciprocably move the spindle motor with respect thereto, radially of the recording medium.

The invention claimed is:

1. A hologram recording and reproducing apparatus recording a hologram in a plurality of unit sectors each corresponding to an illumination spot formed by superposing an information beam and a reference beam on a recording medium which is discal or spherical, and also reproducing the hologram based on light from each of the unit sectors when the illumination spot containing only the reference beam is relatively moved and then stopped at the position where the hologram is recorded, the apparatus comprising:

an address information writer that writes address information representing the position of the unit sectors in the recording medium when it is performed to record the hologram in each of the unit sectors;

an address information reader that reads out the address information from the recording medium when it is performed to reproduce the hologram from the plurality of unit sectors where the hologram is recorded; and an illumination position controller that sequentially positions the illumination spot only containing the reference beam on the plurality of unit sectors based on the address information read out, and relatively moves the illumination spot from one of the unit sectors to another through a shortest path.

2. The hologram recording and reproducing apparatus according to claim 1, further comprising a rotational driver that rotates the recording medium in both directions; and an illumination spot moving device that reciprocates the illumination spot radially of the recording medium, wherein the recording medium is discal, wherein the rotational driver rotates the recording medium in either direction by not more than 180 degrees while the illumination position controller moves the illumination spot radially by a predetermined amount at the same time in order to relatively move the illumination spot from a unit sector to another unit sector circumferentially and radially spaced.

3. The hologram recording and reproducing apparatus according to claim 1, further comprising a rotational driver that rotates the recording medium in both directions around a predetermined axis; and an illumination spot moving device that reciprocates the illumination spot along the predetermined axis, wherein the recording medium is spherical, wherein the rotational driver rotates the recording medium in either direction by not more than 180 degrees while the illumination position controller moves the illumination spot radially by a predetermined amount at the same time in order to relatively move the illumination spot from a unit sector to another unit sector spaced circumferentially and along the predetermined axis.

4. The hologram recording and reproducing apparatus according to claim 2, wherein the rotational driver includes an ultrasonic motor.

5. The hologram recording and reproducing apparatus according to claim 3, wherein the rotational driver includes an ultrasonic motor.

6. A method of recording and reproducing a hologram, the method including recording a hologram in a plurality of unit sectors each corresponding to an illumination spot formed by superposing an information beam and a reference beam on a recording medium which is discal or spherical, and also including reproducing the hologram based on light from each of the unit sectors when the illumination spot containing only the reference beam is relatively moved and then stopped at the position where the hologram is recorded, the method comprising:

an address information writing step including writing address information representing the position of the unit sectors in the recording medium when it is performed to record the hologram in each of the unit sectors;

an address information reading step including reading out the address information from the recording medium when it is performed to reproduce the hologram from the plurality of unit sectors where the hologram is recorded; and an illumination spot position controlling step including sequentially positioning the illumination spot only containing the reference beam on the plurality of unit sectors based on the address information read out, and relatively displacing the illumination spot from one of the unit sectors to another through a shortest path.

* * * * *